(12) United States Patent
Taylor (10) Patent No.: US 7,962,048 B2
(45) Date of Patent: Jun. 14, 2011

(54) PHASE ESTIMATION FOR COHERENT OPTICAL DETECTION

(76) Inventor: Michael George Taylor, Laurel, MD (US)

( * ) Notice: Subject to any disclaimer, the term of this patent is extended or adjusted under 35 U.S.C. 154(b) by 0 days.

(21) Appl. No.: 12/571,614

(22) Filed: Oct. 1, 2009

(65) Prior Publication Data

US 2010/0046942 A1    Feb. 25, 2010

Related U.S. Application Data

(62) Division of application No. 11/413,033, filed on Apr. 27, 2006, now abandoned.

(60) Provisional application No. 60/676,631, filed on Apr. 29, 2005.

(51) Int. Cl.
*H04B 10/06* (2006.01)

(52) U.S. Cl. .......................... 398/202; 398/205; 398/207

(58) Field of Classification Search .................... 398/25, 398/33, 194, 188–189, 202–214
See application file for complete search history.

(56) References Cited

U.S. PATENT DOCUMENTS

| 2003/0016422 A1* | 1/2003 | Wijntjes | 359/183 |
| 2003/0103212 A1* | 6/2003 | Westphal et al. | 356/479 |
| 2004/0218932 A1* | 11/2004 | Epworth et al. | 398/202 |

* cited by examiner

*Primary Examiner* — Dzung D Tran
(74) *Attorney, Agent, or Firm* — Michael L. Diaz (57) ABSTRACT

The present invention is a method and apparatus to make an estimate of the phase of a signal relative to the local oscillator in an optical coherent detection subsystem that employs a digital signal processor having a parallel architecture. The phase estimation method comprises operations that do not use feedback of recent results. The method includes a cycle count function so that the phase estimate leads to few cycle slips. The phase estimate of the present invention is approximately the same as the optimal phase estimate.

11 Claims, 8 Drawing Sheets

PHASE ESTIMATION FOR COHERENT OPTICAL DETECTION

RELATED APPLICATIONS

This application is a divisional application of a U.S. patent application (Ser. No. 11/413,033) entitled "PHASE ESTIMATION FOR COHERENT OPTICAL DETECTION" filed Apr. 27, 2006 now abandoned by Michael G. Taylor which claims the priority date of Provisional Patent Application Ser. No. 60/676,631 by Michael G. Taylor, filed Apr. 29, 2005 and is hereby incorporated by reference.

BACKGROUND OF THE INVENTION

1. Field of the Invention

This invention relates to optical data transmission over optical fibers. Specifically, and not by way of limitation, the present invention relates a method and system providing an estimate of the phase of an optical signal during coherent detection.

2. Description of the Related Art

A. Optical Fiber Communications

Information has been transmitted over optical fibers for some time. Details about this field are disclosed in "Optical Communication Systems," by J. Gowar (Prentice Hall, 2nd ed., 1993) and "Fiber-optic communication systems" by G. P. Agrawal (Wiley, 2nd ed., 1997), which are herein incorporated by reference. The information is usually in the form of binary digital signals, i.e. logical "1"s and "0"s, but fiber optics is also used to transport analog signals, such as cable TV signals. Every optical data transmission system has a transmitter, which emits light modulated with information into the fiber, and a receiver at the far end which detects the light and recovers the information. A long distance digital link may also use one or more digital regenerators at intermediate locations. A digital regenerator receives a noisy version of the optical signal, makes decisions as to what sequence of logical values ("1"s and "0"s) was transmitted, and then transmits a clean noise-free signal containing that information forward towards the destination.

In the 1990's, optical amplifiers were deployed in telephony and cable TV networks, in particular erbium doped fiber amplifiers (EDFAs) were deployed. These devices amplify the optical signals passing through them, and overcome the loss of the fiber without the need to detect and retransmit the signals. A typical long distance fiber optic digital link might contain some digital regenerators between the information source and destination, with several EDFAs in between each pair of digital regenerators. Also in the 1990's, wavelength division multiplexing (WDM) was commercially deployed, which increased the information carrying capacity of the fiber by transmitting several different wavelengths in parallel.

Digital communication systems may include forward error correction (FEC). This field is described in "Error Control Coding: From Theory to Practice" by Peter Sweeney (Wiley, 2002), which is herein incorporated by reference. Block FEC codes are often used with fiber optic transmission systems. At the transmitter, a block of k symbols is coded to a longer block of n symbols, (i.e., overhead is added to the signal). The FEC code is called an (n,k) code. Then, at the receiver, the block of n symbols is decoded back to the original k symbol block. Provided the bit error rate (BER) is not too high, most of the bit errors introduced by the communications channel are corrected. Many fiber optic transmission systems use a standard FEC code based on the Reed-Solomon (255,239) code, as described in ITU-T Standard G.975 "Forward error correction for submarine systems" (International Telecommunication Union, 2000).

B. Direct Detection & Coherent Detection

The transmitter unit for a single WDM channel contains a light source, usually a single longitudinal mode semiconductor laser. Information is imposed on the light by direct modulation of the laser current, or by external modulation, that is by applying a voltage to a modulator component that follows the laser. The receiver employs a photodetector, which converts light into an electric current. There are two ways of detecting the light: direct detection and coherent detection. All the installed transmission systems today use direct detection. Although it is more complex, coherent detection has some advantages, and it was heavily researched into in the 1980s and the start of the 1990s, and has become of interest once again in the past few years.

Most deployed transmission systems impose information on the amplitude (or intensity, or power) of the signal. The light is switched on to transmit a "1" and off to transmit a "0". In the case of direct detection, the photodetector is presented with the on-off modulated light, and consequently the current flowing through it is a replica of the optical power. After amplification the electrical signal is passed to a decision circuit, which compares it to a reference value. The decision circuit outputs an unambiguous "1" or "0".

Figure 1:
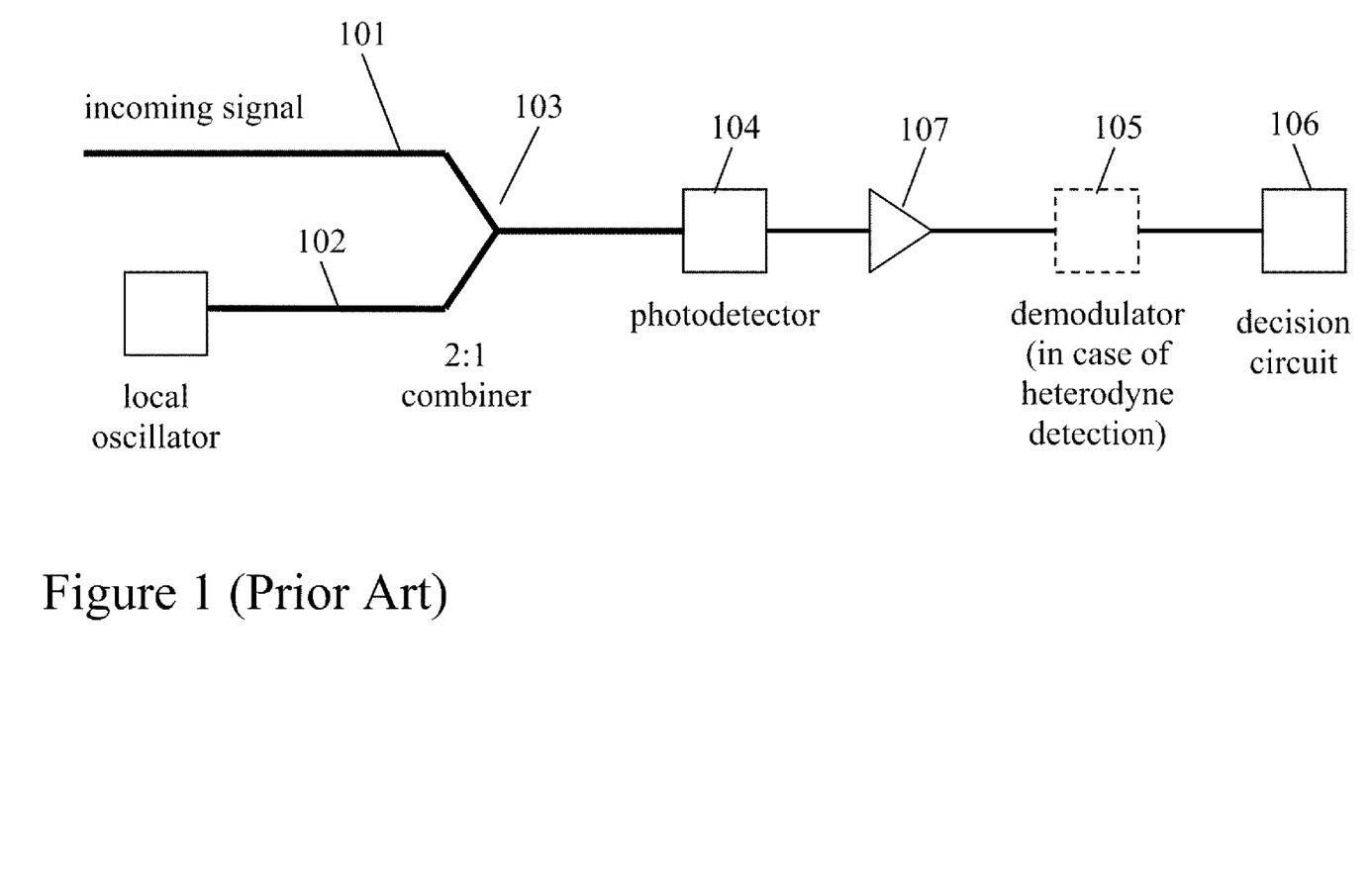
FIG. 1 (Prior Art) illustrates an existing coherent receiver.

The coherent detection method treats the optical wave more like radio, inherently selecting one wavelength and responding to its amplitude and phase. "Fiber-optic communication systems" by G. P. Agrawal provides an introduction to coherent detection. Coherent detection involves mixing the incoming optical signal with light from a local oscillator (LO) laser source. FIG. 1 illustrates an example of a coherent receiver suitable for detecting a binary phase shift keyed (BPSK) signal. The incoming signal 101 is combined with light 102 from a continuous wave (c.w.) local oscillator in a passive 2:1 combiner 103. The LO light has close to the same state of polarization (SOP) as the incoming signal and either exactly the same wavelength (homodyne detection) or a nearby wavelength (heterodyne detection). When the combined signals are detected at photodetector 104, the photocurrent contains a component at a frequency which is the difference between the signal and local oscillator optical frequencies. This difference frequency component, known as the intermediate frequency (IF), contains all the information (i.e., amplitude and phase) that was on the optical signal. Because the new carrier frequency is much lower, typically a few gigahertz instead of 200 THz, all information on the signal can be recovered using standard radio demodulation methods. Coherent receivers see only signals close in wavelength to the local oscillator, and so by tuning the LO wavelength, a coherent receiver can behave as though having a built-in tunable filter. When homodyne detection is used, the photocurrent is a replica of the information and may be amplified 107 and then passed to the decision circuit 106 which outputs unambiguous "1" or "0" values. With heterodyne detection, the photocurrent must be processed by a demodulator 105 to recover the information from the IF. FIG. 1 illustrates a configuration for single-ended detection. There are other configurations for coherent detection. For example, a balanced detection configuration is obtained by replacing the 2:1 combiner by a 2:2 combiner, each of whose outputs are detected and the difference taken by a subtracting component.

Following is a mathematical description of the coherent detection process. (The complex notation for sinusoids is summarised in the Appendix.) The electric field of the signal may be written as $$Re[E_s(t)e^{i\omega_s t+i\phi_s(t)}]$$

where $E_s(t)$ is the slowly varying envelope containing the information encoded on amplitude and phase of the optical signal, $\omega_s$ is the angular frequency of the optical carrier, and $\phi_s(t)$ is the slowly varying phase noise associated with the finite linewidth of the laser. Writing the phase noise separate from the modulation envelope $E_s(t)$ has the advantage that in the case of digital information transmission $E_s(t)$ takes on only a small number of possible values, depending on the digital signal format. Similarly, the electric field of the local oscillator is written as $$Re[E_{LO}e^{i\omega_{LO} t+i\phi_{LO}(t)}]$$

where $E_{LO}$ is a constant given that the local oscillator is c.w., $\omega_{LO}$ is the angular frequency of the LO, and $\phi_{LO}(t)$ is the phase noise on the LO. The electric fields of the signal and LO are written as scalar quantities because it is assumed that they have the same state of polarization. The electric field of the light arriving at the photodetector 104 in FIG. 1 is the sum of the two electric fields $$E_1 = Re[E_s(t)e^{i(\omega_s t+\phi_s(t))}+E_{LO}e^{i(\omega_{LO} t+\phi_{LO}(t))}]$$

and the optical power is $$P_1 = E_1^* E_1$$

$$P_1 = |E_s(t)|^2 + |E_{LO}|^2 + 2Re[E_s(t)E_{LO}^* e^{i(\omega_s-\omega_{LO})t+i(\phi_s(t)-\phi_{LO}(t))}] \quad (1)$$

In the case of single ended detection only one output of the combiner is used. $|E_{LO}|^2$ is constant with time. $|E_s(t)|^2$ is small given that the local oscillator power is much larger than the signal power, and for phase shift keying (PSK) and frequency shift keying (FSK) modulation formats $|E_s(t)|^2$ is constant with time. The dominant term in equation 1 is the beat term $Re[E_s(t)_{LO}^* e^{i(\omega_s-\omega_{LO})t+i(\phi_s(t)-\phi_{LO}(t))}]$. In appropriate conditions the beat term can be readily obtained from the photocurrent in the single-ended detection case. Alternatively, when $|E_s(t)|^2$ is not small and varies with time, the beat term is produced directly by the balanced detection configuration. The equations that follow refer to the beat term. It is assumed that this term is obtained by single ended detection given that the other terms do not contribute or by balanced detection.

There are two modes of coherent detection: homodyne and heterodyne. In the case of homodyne detection the frequency difference between signal and local oscillator is zero, and the local oscillator laser has to be phase locked to the incoming signal in order to achieve this. For homodyne detection the term $e^{i(\omega_s-\omega_{LO})t+i(\phi_s(t)-\phi_{LO}(t))}$ is 1, and the beat term becomes $$Re[E_s(t)E_{LO}^*]$$

For the binary phase shift keying (BPSK) modulation format for example, $E_s(t)$ takes on the value 1 or −1 depending on whether a logical "1" or "0" was transmitted, and the decision circuit can simply act on the beat term directly.

With heterodyne detection there is a finite difference in optical frequency between the signal and local oscillator. All the amplitude and phase information on the signal appears on a carrier at angular frequency ($\omega_s-\omega_{LO}$), the intermediate frequency, and it can be detected with a demodulator using standard radio detection methods. Typically homodyne detection gives better performance than heterodyne detection, but is harder to implement because of the need for optical phase locking. Heterodyne detection can be further divided into two categories: synchronous and asynchronous. With synchronous heterodyne detection the receiver makes an estimate of the optical phase difference between the incoming optical signal and the light from the local oscillator, and applies the phase estimate during the digital decision making process. An asynchronous heterodyne detection receiver does not make an estimate of the phase. The data is obtained via another method, depending on which modulation format was used, such as by taking the difference between one digital symbol and the next (differential detection). Synchronous detection gives better receiver sensitivity than asynchronous detection. Homodyne detection can be considered to be a synchronous coherent detection method, because the process of optical phase locking the local oscillator requires a phase estimate to be made.

C. Sampled Coherent Detection

A new method of coherent detection called sampled coherent detection has been proposed and demonstrated recently, as described in U.S. Patent Application No. 2004/0114939 and in "Coherent detection method using DSP for demodulation of signal and subsequent equalization of propagation impairments" by M. G. Taylor (IEEE Phot. Tech. Lett., vol. 16, no. 2, p. 674-676, 2004), which are herein incorporated by reference. Digital signal processing (DSP) is employed in this method to obtain the information carried by a signal from the beat products seen at the outputs of a phase diverse hybrid. The field of digital signal processing is summarized below.

Figure 2:
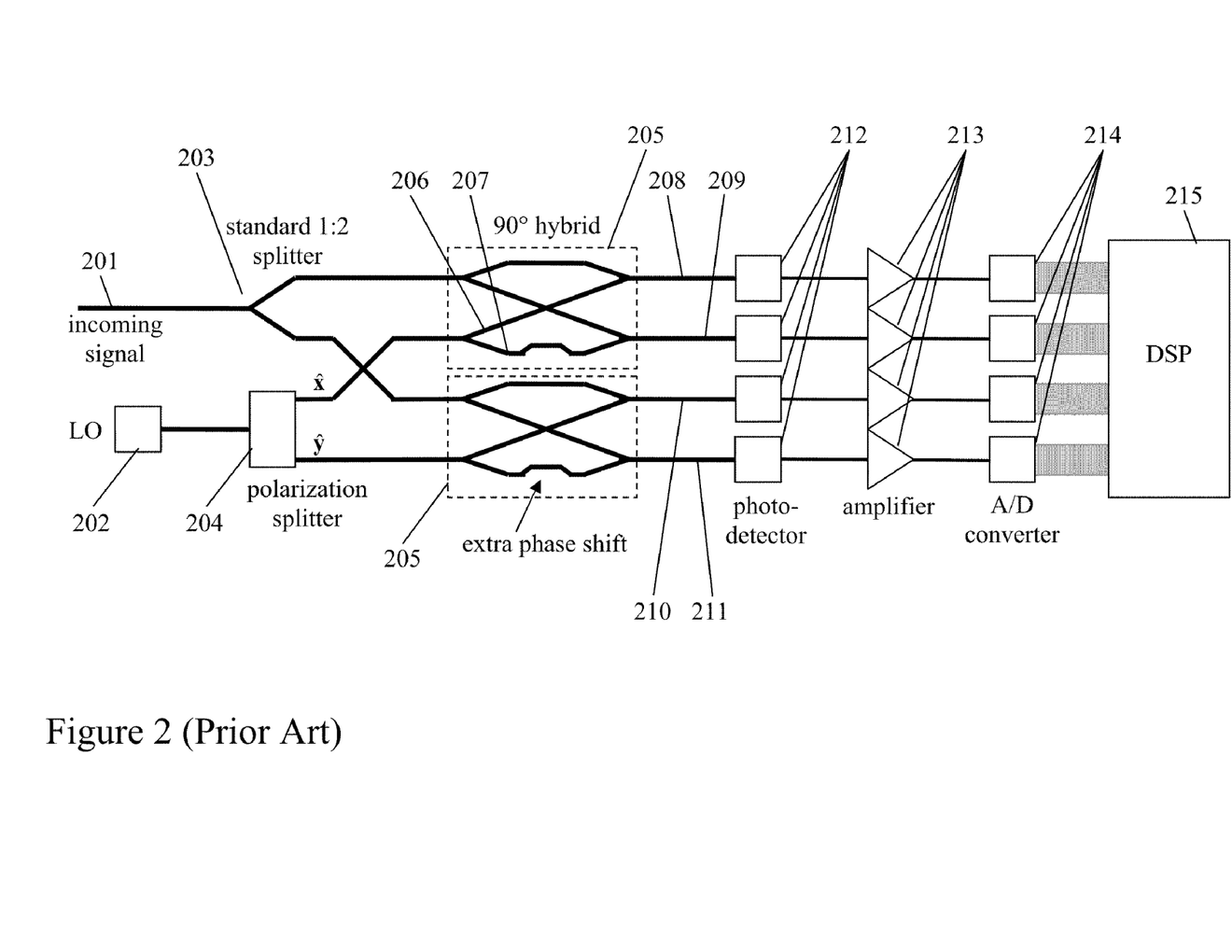
FIG. 2 (Prior Art) illustrates a polarization and phase diverse configuration for sampled coherent detection.

In sampled coherent detection, the signal and local oscillator are combined in a passive component called a phase and polarization diverse hybrid. FIG. 2 shows a sampled coherent detection apparatus. The four outputs of the phase and polarization diverse hybrid are detected by separate photodetectors 212 and then, after optional amplification by amplifiers 213, they are sampled by A/D converters 214. The sample values of the A/D converters are processed by the digital signal processor 215 to calculate the complex envelope of the signal electric field over time. The phase and polarization diverse hybrid has four outputs 208-211 in the example of FIG. 2, where single ended detection is used. The top two outputs 208 and 209 have the LO in one state of polarization, e.g., the horizontal polarization, and the lower two outputs 210 and 211 have the LO in the orthogonal, vertical, polarization. For each of the two LO polarization states, the signal is combined with the LO in a 90° hybrid 205, also known as a phase diverse hybrid. The phase of the LO relative to the signal in one output of the 90° hybrid is different by $\pi/2$ radians (i.e. 90°) compared to the phase of the LO relative to the signal in the other output. This phase shift can be implemented by extra path length in one arm 207 of the 90° hybrid carrying the LO compared to the other arm 206, as can be seen in FIG. 2. The orthogonal SOP relationship between the two 90° hybrids is achieved by using a polarization beamsplitter 204 to divide light from the local oscillator 202 between the two hybrids and a standard 1:2 splitter 203 to divide the incoming signal light 201.

The following mathematical treatment explains how the electric field of the signal is obtained from the outputs of the phase and polarization diverse hybrid. The incoming signal electric field can be written as $$RE[E_s(t)e^{i\omega_s t+i\phi_s(t)}]$$

where $E_s(t)$ is a Jones vector, a two-element vector comprising the polarization components of the electric field in the horizontal and vertical directions. The use of Jones vectors is summarised in the Appendix.

$$E_s(t) = \begin{pmatrix} E_{sx}(t) \\ E_{sy}(t) \end{pmatrix}$$

Each of the four outputs of the phase and polarization diverse hybrid in FIG. 2 contains signal $Re\rfloor E_s(t)e^{i\omega_s t+i\phi_s(t)}\rfloor$. The local oscillator in the four outputs is different, and can be written as follows top output ... $Re\lfloor E_{LO}e^{i\omega_{LO}t+i\phi_{LO}(t)}\tilde{x}\rfloor$ 2nd output ... $Re\lfloor i\, E_{LO}e^{i\omega_{LO}t+i\phi_{LO}(t)}\tilde{x}\rfloor$ 3rd output ... $Re\lfloor E_{LO}e^{i\omega_{LO}t+i\phi_{LO}(t)}\tilde{y}\rfloor$ 4th output ... $Re\lfloor i\, E_{LO}e^{i\omega_{LO}t+i\phi_{LO}(t)}\tilde{y}\rfloor$ In the top two arms the LO is horizontally polarized, in the direction of Jones unit vector $\tilde{x}$, and in the lower two arms vertical in the direction of $\tilde{y}$. The $\pi/2$ phase shift is accounted for by the multiplicative imaginary number i. The beat term parts of the optical powers in the four outputs 208 through 211 are therefore beat term $1 = Re\lfloor E_{sx}(t)E_{LO}*e^{i(\omega_s-\omega_{LO})t+i(\phi_s(t)-\phi_{LO}(t))}\rfloor$ beat term $2 = Im\lfloor E_{sx}(t)E_{LO}*e^{i(\omega_s-\omega_{LO})t+i(\phi_s(t)-\phi_{LO}(t))}\rfloor$ beat term $3 = Re\lfloor E_{sy}(t)E_{LO}*e^{i(\omega_s-\omega_{LO})t+i(\phi_s(t)-\phi_{LO}(t))}\rfloor$ beat term $4 = Im\lfloor E_{sy}(t)E_{LO}*e^{i(\omega_s-\omega_{LO})t+i(\phi_s(t)-\phi_{LO}(t))}\rfloor$ It follows that the envelope of the signal electric field is related to the observed beat terms by $$E_s(t) = \frac{e^{-i(\omega_s-\omega_{LO})t-i(\phi_s(t)-\phi_{LO}(t))}}{E_{LO}^*}\begin{pmatrix}(\text{beat term 1}) + i(\text{beat tterm 2}) \\ (\text{beat term 3}) + i(\text{beat term 4})\end{pmatrix} \quad (2)$$

In order to implement equation 2, the frequency difference as $\omega_s-\omega_{LO}$ and phase difference $\phi_s(t)-\phi_{LO}(t)$ must be known. The digital signal processor must make estimates of these quantities and apply these to make an estimate of the signal electric field envelope.

$$\hat{E}_s(t) = \frac{e^{-i\hat{\omega}t-i\hat{\phi}(t)}}{E_{LO}^*}\begin{pmatrix}(\text{beat term 1}) + i(\text{beat term 2}) \\ (\text{beat term 3}) + i(\text{beat term 4})\end{pmatrix} \quad (3)$$

$\hat{E}_s(t)$ is an estimate of the true signal electric field envelope $E_s(t)$, and the decision of the data carried by the signal is derived from $\hat{E}_s(t)$. $\hat{\omega}$ is an estimate of the angular frequency difference $\omega_s-\omega_{LO}$. $\hat{\phi}(t)$ is an estimate of the optical phase difference between signal and local oscillator $\phi_s(t)-\phi_{LO}(t)$. Clearly if the estimates $\hat{\omega}$ and $\hat{\phi}(t)$ are exactly correct, then equation 3 becomes equation 2, and the estimate of the signal electric field envelope $\hat{E}_s(t)$ is equal to the true envelope $E_s(t)$. Conversely, any inaccuracy in the estimates $\hat{\omega}$ and $\hat{\phi}(t)$ leads to errors in the received digital data. The object of the present invention is to make an accurate phase estimate within the digital signal processor.

The digital information is imposed on the signal electric field envelope as a sequence of symbols regularly spaced in time. To recover the information the digital signal processor must also have an estimate of the times of the symbol centers (i.e., a symbol clock).

Transmission over a length of optical fiber transforms the state of polarization of an optical signal, so that the digital values taken on by $E_s(t)$ as seen at the receive end of a fiber optic transmission system are typically not the same as those imposed at the transmit end. The polarization transformation can be reversed within the DSP by multiplying by the appropriate rotation Jones matrix R, so that the first element of the Jones vector contains the complex envelope of an information-bearing signal.

$$\hat{E}_s(t) = \frac{e^{-i\hat{\omega}t-i\hat{\phi}(t)}}{E_{LO}^*}\tilde{x} \cdot R\begin{pmatrix}(\text{beat term 1}) + i(\text{beat term 2}) \\ (\text{beat term 3}) + i(\text{beat term 4})\end{pmatrix} \quad (4)$$

($\hat{E}_s(t)$ is written without boldface because it represents a complex electric field without regard to polarization, and not a Jones vector.) The correct rotation matrix R can be estimated by exploring the available space and then locking on to the matrix which gives the best quality signal. The polarization transformation of the optical fiber typically changes slowly, so the rotation matrix must be allowed to update. Alternatively the SOP of the local oscillator can be matched to that of the signal by a hardware polarization controller, so that equation 3 need be implemented only for one element of the Jones vector $E_s(i)$, based on two phase diverse hybrid outputs instead of four.

$$\hat{E}_s(t) = \frac{e^{-i\hat{\omega}t-i\hat{\phi}(t)}}{E_{LO}^*}((\text{beat term 1}) + i(\text{beat term 2})) \quad (5)$$

The Jones vector $E_s(t)$ constitutes a complete description of the optical signal, or more precisely of the signal's optical spectrum in the region of the local oscillator. This means that any parameter of the optical signal can be deduced from $E_s(t)$. Employing sampled coherent detection is more complex than direct detection, but has many benefits. Phase encoded modulation formats can be employed, such as BPSK and quadrature phase shift keying (QPSK), which offer better sensitivity than on-off modulation formats. Also polarization multiplexed formats can be employed, which offer twice the information capacity for a given bandwidth of electro-optic components and a given optical spectral bandwidth. The polarization demultiplexing operation is performed within the digital signal processor, so no additional optical components are needed for it. In a long fiber optic transmission system carrying high bit rate signals, the optical fiber propagation effects, such as chromatic dispersion and polarization mode dispersion, distort the signals. With sampled coherent detection, the propagation effects can be reversed within the DSP by applying an appropriate mathematical operation. Finally, a key benefit of sampled coherent detection is that it is equivalent to passing the signal through a narrow optical filter centred on the local oscillator wavelength, so no narrow optical filter components are needed for WDM. The LO can be tuned in wavelength, which is equivalent to tuning the optical filter.

D. Digital Signal Processing

Figure 3A:
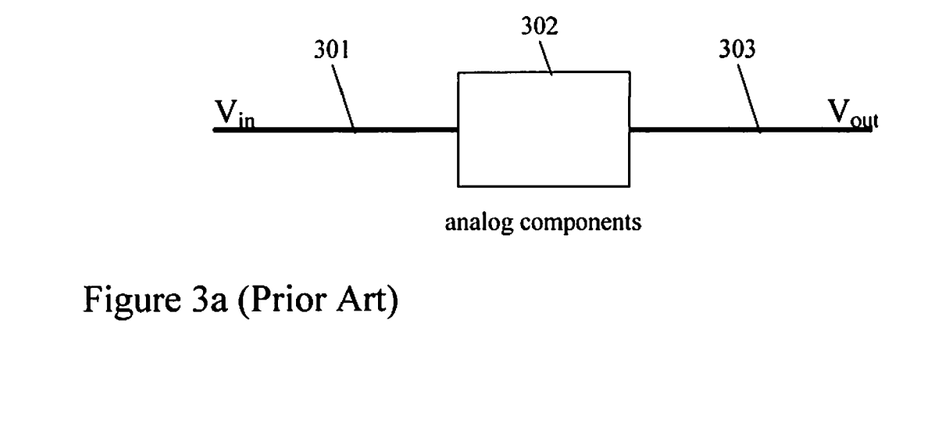
FIG. 3a (Prior Art) illustrates a generic diagram of an analog signal processor.
Figure 3B:
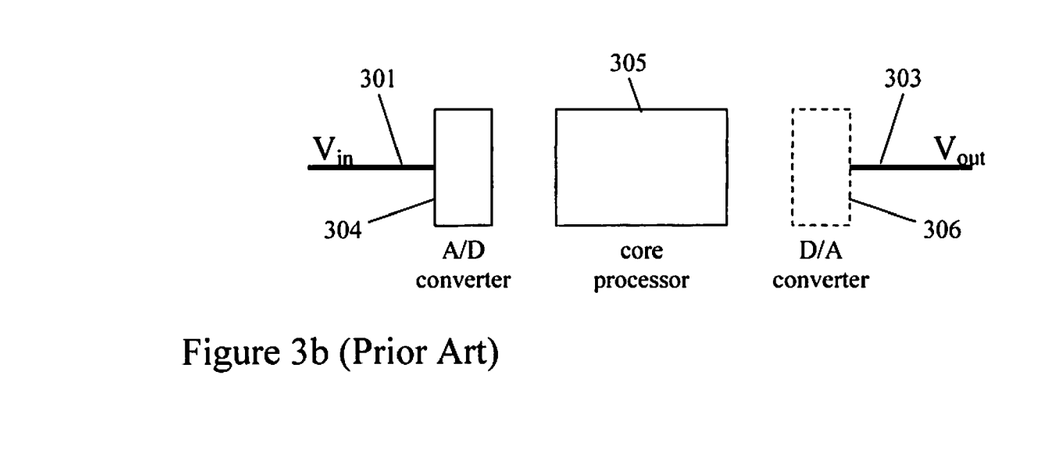
FIG. 3b (Prior Art) illustrates a generic diagram of a digital signal processor.

The present invention utilizes digital signal processing (DSP). DSP is described in "Understanding Digital Signal Processing" by R. G. Lyons (Prentice Hall, 1996) and "Digital Signal Processing: Principles, Algorithms and Applications" by J. G. Proakis & D. Manolakis (Prentice Hall, 3rd ed., 1995), herein incorporated by reference. A signal processor is a unit which takes in a signal, typically a voltage vs. time, and performs a predictable transformation on it, which can be described by a mathematical function. FIG. 3a shows a generic analog signal processor (ASP). The box 302 transforms the input signal voltage 301 into the output signal voltage 303, and may contain a circuit of capacitors, resistors, inductors, transistors, etc. FIG. 3b illustrates a digital signal processor. First, the input signal 301 is digitized by the analog to digital (A/D) converter 304, that is converted into a sequence of numbers, each number representing a discrete time sample. The core processor 305 uses the input numerical values to compute the required output numerical values, according to a mathematical formula that produces the required signal processing behavior. The output values are then converted into a continuous voltage vs. time by the digital to analog (D/A) converter 306. Alternatively, for applications in a digital signal receiver, the analog output of the DSP may go into a decision circuit to produce a digital output. In such a situation, the digital processing core may perform the decision operation and output the result, in which case the D/A converter 306 is not needed.

The digital filter is an operation that may be executed in a digital signal processor. A sequence of filtered output values Y(n), n=0, 1, 2, 3 ..., is calculated from input values X(n) by $$Y(n) = \sum_{k=0}^{B} b(k)X(n-k) + \sum_{k=1}^{A} a(k)Y(n-k) \qquad (6)$$

The b(k) are known as feedforward tap weights, and the a(k) are feedback tap weights. The digital filter of equation 6 may be written in terms of a z-transfer function $$Y(z) = \frac{\sum_{k=0}^{B} b(k)z^{-k}}{1 - \sum_{k=1}^{A} a(k)z^{-k}} X(z)$$

X(z) and Y(z) are the z-transforms of X(n) and Y(n) respectively.

Figure 3C:
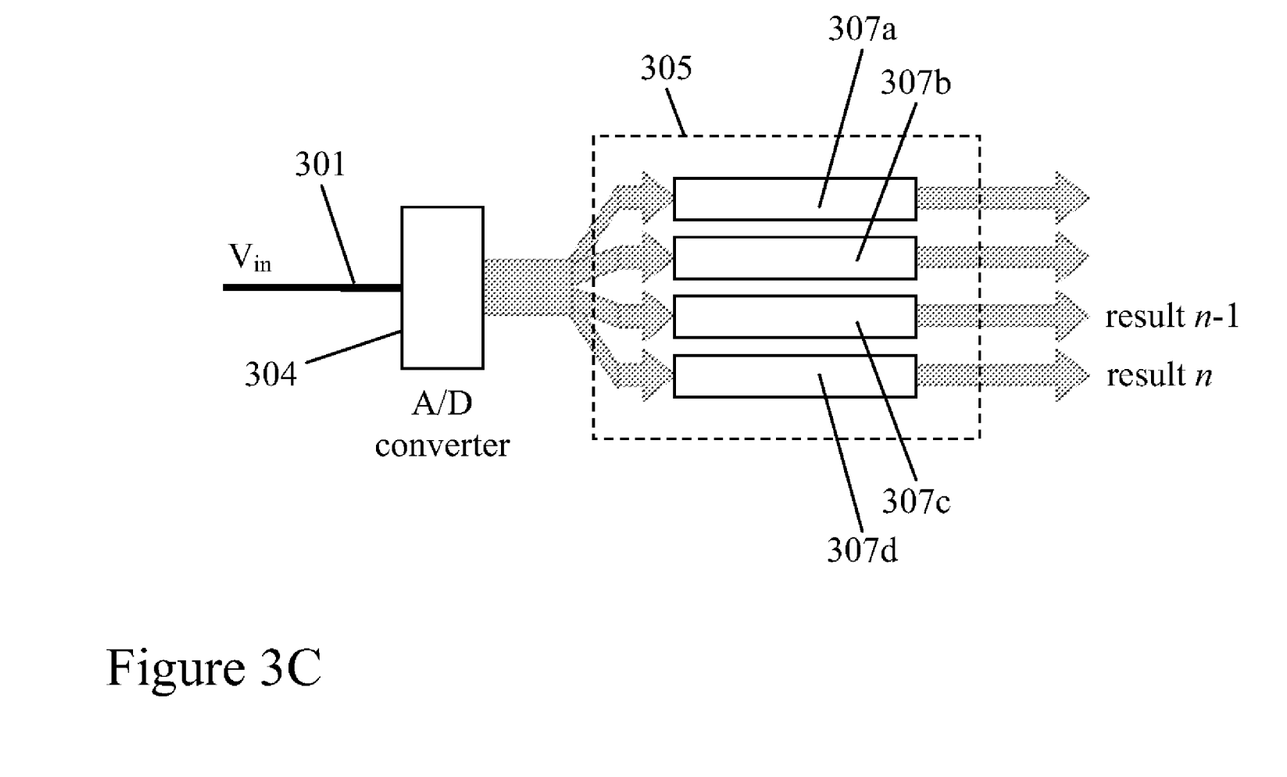
FIG. 3C (Prior Art) illustrates a digital signal processor having a parallel architecture.

The applications of digital signal processing in optical coherent detection of communications signals may be such that the clock speed of the logic in the digital signal processor is slower than the symbol rate at which information is transmitted. For example, the DSP clock speed may be 10 GHz while the information signaling rate is 10 Gbaud. This means that the DSP must operate in parallel (FIG. 3C). The incoming symbols are first demultiplexed into parallel branches 307a, 307b, 307c, 307d, and then each branch is processed at the low logic clock speed. A constraint of such a parallel architecture is that symbol n–1 may be processed at the same time as symbol n, so the result of an operation on symbol n–1 is not available at the commencement of the operation on symbol n. Many signal processing algorithms feed back the result of operation n–1 to calculate operation n. Such an algorithm cannot be implemented in a parallel digital processor. The parallel operation of the DSP is equivalent to imposing a delay on any feedback paths. It is an object of the present invention to estimate the optical phase in the digital signal processor without using feedback from immediately preceding results, but instead employing algorithms that do not use any feedback or that use feedback from distant past results.

E. Existing Phase Estimation Methods

Digital communications over radio and electrical cables has led to the development of methods for estimation of the phase of the carrier of a narrowband signal. Many of these methods are described in "Digital Communications" by J. G. Proakis (McGraw-Hill, 4th ed., 2000), "Digital communication receivers: synchronization, channel estimation & signal processing" by H. Meyr, M. Moeneclaey & S. A. Fechtel (Wiley, 1998) and "Synchronization techniques for digital receivers" by U. Mengali & A. N. D'Andrea (Plenum Press, 1997), which are herein incorporated by reference. The delay to the times of the symbol centers, the frequency difference between the signal and local oscillator and the phase of the signal compared to the local oscillator are collectively known as reference parameters or as synchronization parameters. With coherent optical detection there is an additional reference parameter: the state of polarization of the signal compared to the LO. The best possible estimate of a reference parameter that can be made based on the noisy observations is known as the optimal estimate. If a reference parameter changes unpredictably, but these changes are slow, then it is possible to use an estimate which deviates from the optimal estimate without causing a significant increase in the number of errors in the detected digital information. Also an algorithm with feedback to distant past results may be used. This means that a simple algorithm convenient for implementation in the DSP may be chosen to estimate a slowly varying reference parameter. However, it is important to make an estimate close to the optimal estimate for a reference parameter that changes rapidly on the time scale of the symbol period, otherwise there will be a substantial increase in the bit error rate. In a typical implementation of coherent detection of optical signals, the symbol clock, the frequency difference between signal and local oscillator, and the SOP of the signal all vary slowly. Techniques are available to estimate these parameters. However, the optical phase of the signal compared to the local oscillator may vary rapidly and randomly, unless expensive narrow linewidth lasers are used. A near optimal estimate of the phase is therefore needed. It is clear that any phase estimation method from the field of radio can be applied to optical coherent detection. However there is no application in radio with the same level of phase noise as with optical coherent detection. In a possible configuration using decision feedback (DFB) lasers, the combined laser linewidth $\Delta\nu$ may be 10 MHz and the signaling rate 10 Gbaud, so that the product of symbol time and linewidth is $\tau_s \Delta\nu = 10^{-3}$. There are no examples in the prior art having such a high $\tau_s \Delta\nu$, and the methods used in radio cannot be applied to optical coherent detection.

Experiments were performed with synchronous optical coherent detection in the early 1990's which inherently made an estimate of the phase. Examples are "4-Gb/s PSK Homodyne Transmission System Using Phase-Locked Semiconductor Lasers" by J. M. Kahn et al. (IEEE Phot. Tech. Lett., vol. 2, no. 4, p. 285-287, 1990) and "An 8 Gb/s QPSK Optical Homodyne Detection Experiment Using External-Cavity Laser Diodes" by S. Norimatsu et al. (IEEE Phot. Tech. Lett., vol. 4, no. 7, p. 765-767, 1992). These experiments used continuous time analog signal processing, but it is clear that an equivalent discrete time algorithm could be derived from the analog signal processing function. The experiments used decision directed detection and phase locked loops, both of which use feedback. In the experiments the feedback paths were kept purposely short. It was known that long feedback delay times imposed a requirement for narrow linewidth lasers, as is discussed in "Damping factor influence on linewidth requirements for optical PSK coherent detection systems" by S. Norimatsu & K. Iwashita (IEEE J. Lightwave Technol., vol. 11, no. 7, p. 1226-1233, 1993). In a DSP implementation the effective length of the feedback path is constrained by the clock frequency of the DSP logic. Also the experiments used external cavity lasers having low linewidth instead of less expensive integrated semiconductor lasers, such as DFB lasers. So the techniques used in these optical coherent detection experiments do not provide a solution for implementing optical coherent detection using digital signal processing with inexpensive wide linewidth lasers.

"PLL-Free Synchronous QPSK Polarization Multiplex/ Diversity Receiver Concept With Digital I&Q Baseband Processing" by R. Noé (IEEE Phot. Tech. Lett., vol. 17, no. 4, p. 887-889, 2005) discloses a phase estimation method for optical coherent detection using digital signal processing, which is suitable for a parallel DSP because it does not employ feedback. The method has been implemented experimentally in "Unrepeatered optical transmission of 20 Gbit/s quadrature phase-shift keying signals over 210 km using homodyne phase-diversity receiver and digital signal processing" by D.-S. Ly-Gagnon et al. (IEE Electron. Lett., vol. 41, no. 4, p. 59-60, 2005). This phase estimation method involves applying a fourth power nonlinearity and then taking a simple average of complex field values of a group of contiguous symbols, which is equivalent to planar filtering with a rectangular time response filter. The rectangular time response filter is chosen because it does not employ feedback. However, this filter shape is not close to the optimal filter shape, which increases the bit error rate. Differential logical detection is used after decisions are made to avoid the impact of cycle slips, but it has the disadvantage that it increases the bit error rate. Another disadvantage is that every time the filter complex output crosses the negative real boundary (every time a cycle count occurs) an extra symbol error is inserted, which leads to a background bit error rate even when the transmission system additive noise is low. It would be better to include a cycle count function to avoid the effect of cycle slips, but cycle count functions use feedback.

Although not proposed for applications like optical coherent detection where the oscillators have high linewidth, there are phase estimation solutions in the field of radio that work with a randomly varying phase. A method is disclosed in "Digital communication receivers: synchronization, channel estimation & signal processing" by H. Meyr et al. where the complex field is operated on by a nonlinear function and then passed to a planar filter having transfer function $$H(z) = \frac{1 - \alpha_{pp}}{1 - \alpha_{pp} z^{-1}}$$

This is similar to the zero lag Wiener filter phase estimation method of the present invention which is described below, and has the transfer function of equation 13. However the disclosure does not identify how to choose $\alpha_{pp}$ to obtain a close approximation to the optimal zero-lag phase estimate. Also the transfer function involves feedback to the immediately preceding result, and the disclosure does not explain how to implement the filter in a parallel digital signal processor. The same disclosure describes how to unwrap the phase of the planar filter output by using a cycle count function. The basic equation of the phase unwrapping method is the same as equation 22 that is used in the present invention, described below. However the cycle count function in the disclosure (and that of equation 22) employs feedback from the immediately preceding result, and the disclosure does not explain how to implement the cycle count function in a parallel digital signal processor.

Thus there is a need for a phase estimation method that can be implemented in a parallel digital signal processor architecture, and which does not use feedback from recent results. There is also a further need for such a phase estimation method to provide an estimate which is close to the optimal phase estimate. It is an object of the present invention to provide such a methodology and system.

SUMMARY OF THE INVENTION

In one aspect, the present invention is a method and apparatus to make an estimate of the phase of a signal relative to the local oscillator in an optical coherent detection subsystem that employs a digital signal processor having a parallel architecture. The phase estimation method comprises operations that do not use feedback of recent results. The method includes a cycle count function so that the phase estimate leads to few cycle slips. The phase estimate of the present invention is approximately the same as the optimal phase estimate.

The digital signal processor in the optical coherent detection apparatus forms a sequence of complex values corresponding to the electric field of the symbols before a phase estimate is applied. The method of making a phase estimate has the following stages. First, a nonlinear function is applied to the sequence of electric field values to remove the averaging effect of the transmitted data. Then a digital filter is applied, whose transfer function is a Wiener filter. The feedback and feedforward taps of the filter are chosen using a look-ahead computation, so that the filter has the correct Wiener filter transfer function, but it can be implemented without feedback of recent results. The Wiener filter is the optimal linear estimate of the phase. Two kinds of Wiener filter may be used, zero-lag or finite-lag filters. Next a cycle count operation is performed. The cycle count function is derived using a look-ahead computation, so that it can be implemented without feedback of recent results. The nonlinear function is then reversed to give a sequence of complex values whose phases are the final phase estimate. The reversal of the nonlinear function is performed taking into account the cycle count. This means that there are few cycle slips. After applying the phase factor to the original sequence of electric field values, a decision is made on the digital value of each symbol. Differential logical detection may be subsequently applied to remove the impact of any remaining cycle slips. This may be followed by decoding of any forward error correction code on the transmitted data. The FEC code may be chosen to correct short bursts of errors, so that the differential logical detection operation does not lead to excess bit errors.

DESCRIPTION OF THE INVENTION

The present invention is a phase estimation method that can be implemented in a parallel digital signal processor architecture, and which does not use feedback from recent results. There are many modulation formats used to transmit digital information on subcarriers. The methods used to estimate the phase may differ in the details, but have a common basic approach, as is discussed in "Digital communication receivers: synchronization, channel estimation & signal processing" by H. Meyr et al. and "Synchronization techniques for digital receivers" by U. Mengali & A. N. D'Andrea. The method to estimate the phase of an Mary PSK signal will be described below. It will be apparent to those skilled in the art that the present invention for making phase estimates may be utilized for other modulation formats, such as offset QPSK or QAM.

Figure 4:
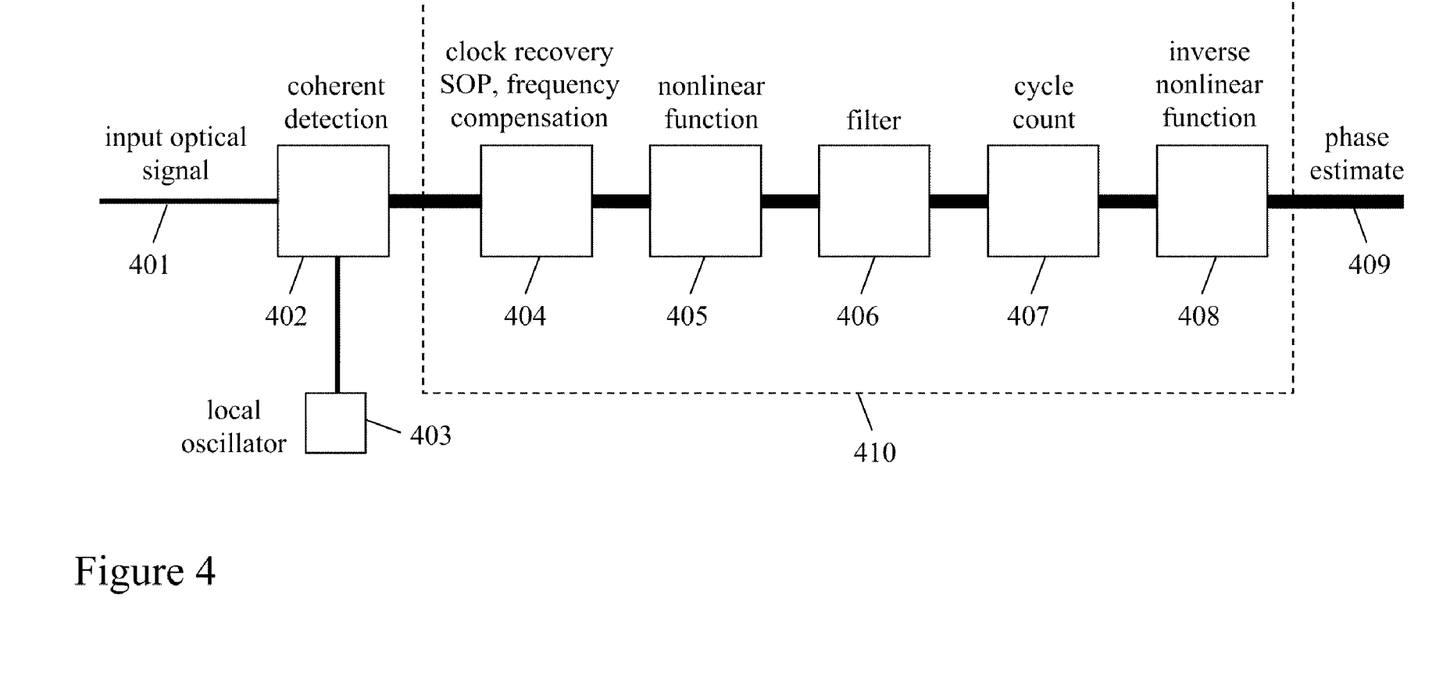
FIG. 4 illustrates the phase estimation process in the preferred embodiment of the present invention.

FIG. 4 illustrates the phase estimation process in the preferred embodiment of the present invention. The optical signal 401 is input to a sampled coherent detection unit 402. The frequency difference between signal and local oscillator 403 and the state of polarization of the signal compared to the local oscillator may be estimated accurately by known methods, since these reference parameters vary slowly in a typical optical transmission system. The complex variable r(t) is formed by applying compensations for the frequency difference $\hat{\omega}$ and for the signal SOP to the electric field envelope derived from the beat terms in the optical powers at the phase diverse hybrid outputs. In the case of the polarization diverse coherent detection configuration, in analogy with equation 4

$$r(t) = \frac{e^{-i\hat{\omega}t}}{E_{LO}^*} \hat{x} \cdot R \begin{pmatrix} (\text{beat term 1}) + i(\text{beat term 2}) \\ (\text{beat term 3}) + i(\text{beat term 4}) \end{pmatrix}$$

Similarly for the case where the SOP of the local oscillator is aligned with that of the signal by a hardware polarization controller, in analogy with equation 5

$$r(t) = \frac{e^{-i\hat{\omega}t}}{E_{LO}^*}((\text{beat term 1}) + i(\text{beat term 2}))$$

An alternative to compensating for the frequency difference $\hat{\omega}$ within the DSP is to control the optical frequency of the local oscillator laser so that the frequency difference is zero. r(t) is related to the signal envelope of the transmitted optical signal (or to one of the transmitted polarization multiplexed tributaries in the case of a polarization multiplexed optical signal) by $$r(t) = e^{i\phi(t)} E_s(t) \tag{7}$$

where $$\phi(t) = \phi_s(t) \phi_{LO}(t)$$

The task is to determine φ(t) from the available values of r(t), so that $E_s(t)$ can be calculated by inverting equation 7.

The symbol clock may also be determined by existing techniques. The digital signal processor is able to calculate the values of r(t) at the centers of the symbols $$r(n\tau_s) \, n=0, 1, 2, 3 \ldots$$

where it is assumed that the origin of time t is chosen so as to lie at a symbol center. In this document $r(n\tau_s)$ will be written as r(n) for compactness. Any variable which is a function of t is understood to be a continuous time function; a variable which is a function of n represents the equivalent discrete time function sampled at the symbol centers; and a variable which is a function of z represents the z-transform of the discrete-time variable. The SOP estimation, frequency difference compensation and the process or retiming according to the recovered symbol clock are performed in element 404 of FIG. 4 within the digital signal processor 410.

If the transmitter and local oscillator lasers have Lorentzian lineshape, which is the typical laser lineshape, then $$\phi(n) = \phi(n-1) + w(n) \tag{8}$$

where w(n) is a zero-mean Gaussian noise sequence. The variance $\sigma_w^2$ of w(n) is related to the combined full width half maximum linewidth Δv of the lasers by $$\sigma_w^2 = 2\pi\tau_s \Delta v$$

The electric field envelope imposed on the transmitted signal by data modulation is $$E_s(n) = d(n) E_{s0} \tag{9}$$

where $E_{s0}$ is a real constant and d(n) is a sequence of values coding the data to be transmitted, these values being taken from the M-member set $\sqrt[M]{1}$. For BPSK the set is {−1,1}, and for QPSK it is {−i,−1,i,1}. After modulation onto the transmitter laser, transmission through a fiber optic transmission system and detection, the received signal is (ignoring the scaling factor experienced by $E_{s0}$ from transmitter to receiver)

$$r(n) = E_{s0} e^{i\phi(n)} (d(n) + p(n)) \tag{10}$$

where p(n) is a zero-mean complex Gaussian noise sequence whose real and imaginary parts each have variance $\sigma_p^2$, and which represents the additive noise whose variance (of each complex component) is $E_{s0}^2 \sigma_p^2$.

The next step in the phase estimation process executed in element 405 by the digital signal processor is to apply a power law nonlinear function to the observed values r(n)

$$s(n) = r(n)^M$$

From equation 10, and since $d(n)^M = 1$ for all possible values of d(n), it follows that $$s(n) = E_{s0}^M e^{iM\phi(n)} (1 + Mp'(n)) \tag{11}$$

where p'(n) is a different zero-mean complex Gaussian noise sequence from p(n), but which also has real and imaginary parts with variance $\sigma_p^2$; and terms of order $p(n)^2$ or higher have been neglected given that the signal-to-noise ratio (SNR) is large. Taking the phase angle of both sides of equation 11, and assuming that a small angle approximation can be applied given that the SNR is large $$\theta(n) = M\phi(n) + M\, Im[p'(n)] \tag{12}$$

where $$\theta(n) = \arg_{unwrapped}[s(n)]$$

θ(n) and θ(n) are both unwrapped phase angles (i.e., lie in the range −∞ to ∞).

Studying equation 12, which is approximately true when the SNR is high, Im[p'(n)] is a zero-mean real Gaussian noise sequence having variance $\sigma_p^2$, and the statistics of φ(n) are known from equation 8. According to estimation theory, the best linear estimate of φ(n) is made by applying a Wiener filter to the observable quantity θ(n). There are two kinds of Wiener filter that can be applied: a filter having zero lag and a filter having a lag of D symbols. Following the prescription laid out in "Digital Signal Processing: Principles, Algorithms and Applications" by J. G. Proakis & D. Manolakis, the zero-lag Wiener filter has transfer function $$\hat{\phi}(z) = \frac{1}{M} \frac{1-\alpha}{1-\alpha z^{-1}} \theta(z) \tag{13}$$

and the finite-lag filter has transfer function $$\hat{\phi}(z) = \frac{1}{M} \frac{(1-\alpha)\alpha^D + (1-\alpha)^2 \sum_{k=1}^{D} \alpha^{D-k} z^{-k}}{1-\alpha z^{-1}} \theta(z) \tag{14}$$

where $$\alpha = \frac{\sigma_w^2 + 2\sigma_p^2 - \sigma_w\sqrt{\sigma_w^2 + 4\sigma_p^2}}{2\sigma_p^2} \tag{15}$$

The role of the Wiener filter is to smooth out the rapidly varying random contribution from the additive noise to obtain a result which is close to the inertial randomly changing phase. The finite-lag filter works better than the zero-lag filter because it effectively looks forward in time by D symbols to decide on its smoothed output, as well as looking at the infinite past. The Wiener filter transfer functions of equations 13 and 14 have been derived assuming the phase noise follows the Gaussian random walk statistics of equation 8 and the additive noise is Gaussian. The appropriate Wiener filter may be calculated if the two noise sources have other statistical behavior.

The digital filter is implemented with the feedforward taps determined by the coefficients of the powers of z in the numerator, and the feedback taps determined by the coefficients in the denominator, according to the well known principles of digital signal processing. The Wiener filters cannot be directly realized in a parallel digital signal processor, however, because the denominators of both equations 13 and 14 contain terms in $z^{-1}$, indicating feedback of the immediately preceding result. To resolve this issue, the Wiener filter algorithms may be recast using a look-ahead computation, as is described in "VLSI digital signal processing systems: Design and implementation" by K. K. Parhi (Wiley, 1999), which is herein incorporated by reference. The look-ahead computation involves replacing all terms in an algorithm of result n–C with the expression containing terms n–C–1 and older, and repeating this process until the algorithm contains only sufficiently old results that it can be implemented. For the z-transfer functions of equations 13 and 14, recasting using a look-ahead computation is expressed as multiplying both numerator and denominator by the same polynomial $$\sum_{k=0}^{L-1} \alpha^k z^{-k}$$

where L is a suitably chosen positive integer. Equation 13 for the zero-lag Wiener filter becomes $$\hat{\phi}(z) = \frac{1}{M} \frac{(1-\alpha)\sum_{k=0}^{L-1} \alpha^k z^{-k}}{1-\alpha^L z^{-L}} \theta(z) \tag{16}$$

and equation 14 for the finite-lag Wiener filter becomes $$\hat{\phi}(z) = \frac{1}{M} \frac{\left((1-\alpha)\alpha^D + (1-\alpha)^2 \sum_{k=1}^{D} \alpha^{D-k} z^{-k}\right)\sum_{k=0}^{L-1} \alpha^k z^{-k}}{1-\alpha^L z^{-L}} \theta(z) \tag{17}$$

Both z-transfer functions now have a denominator containing $z^{-L}$, which refers to feedback of a result L symbols in the past, where L can be chosen by the DSP designer. Hence, both Wiener filters may now be implemented directly in a parallel digital signal processor. The numerator in equation 16 is written as the product of two sums, and the product may be expanded to give the feedforward tap weights for a given D and L. The digital filters have become more complicated, in that the number of feedforward taps has increased from D+1 to D+L. If $\alpha^L$ is very small then the feedback tap can be omitted, and the digital filter becomes a feedforward-only filter.

There are several ways to implement the digital filter, by acting on different quantities. The phase estimate may take the form of a phase angle $\hat{\phi}(n)$ or a phase factor $e^{i\hat{\phi}(n)}$. In one embodiment of the present invention. the digital signal processor calculates the phase angle of values s(n) using a look-up table, for example, unwraps the phase using the method described below, and then applies the Wiener filter to the values of θ(n) to obtain the phase estimate $\hat{\phi}(n)$. In a second preferred embodiment of the invention, the Wiener filter is applied to the complex values s(n) as a planar filter, instead of to the phase angle values θ(n). A parameter u(z) is calculated in element 406 in FIG. 4 by applying the digital filter to s(n). In the case of the zero-lag Wiener filter $$u(z) = \frac{(1-\alpha)\sum_{k=0}^{L-1} \alpha^k z^{-k}}{1-\alpha^L z^{-L}} s(z) \tag{18}$$

and for the finite-lag Wiener filter $$u(z) = \frac{\left((1-\alpha)\alpha^D + (1-\alpha)^2 \sum_{k=1}^{D} \alpha^{D-k} z^{-k}\right)\sum_{k=0}^{L-1} \alpha^k z^{-k}}{1-\alpha^L z^{-L}} s(z) \tag{19}$$

It can be verified that the phase angle of u(z) is approximately equal to $M\hat{\phi}(n)$ given that a small angle approximation applies. The phase factor may therefore be calculated in element 408

$$e^{-i\hat{\phi}(n)} = \sqrt[M]{\frac{u^*(n)}{|u(n)|}} \quad (20)$$

and this phase factor 409 is applied to calculate the required electric field envelope $\hat{E}_s(n)$ $$\hat{E}_s(n) = e^{-i\hat{\phi}(n)} r(n) \quad (21)$$

The data estimate $\hat{d}(n)$ may then be obtained via equation 9. The Mth root in equation 20 may take on M possible values, and the root must be chosen taking into account the cycle count of u(n), as is discussed below. Simulations indicate that for a given additive noise and combined laser linewidth, the preferred embodiment of the invention using planar filtering (using equations 18, 19 and 20) leads to a lower bit error rate than the alternative embodiment where the digital filter acts on the phase angle of s(n).

Both of the embodiments described above make use of a cycle count function. The cycle count of a complex variable is an integer which is incremented every time the variable crosses the negative real axis in an increasing phase direction, and decremented every time the variable crosses that axis in a decreasing phase direction. The cycle count $c_u(n)$ of complex variable u(n) may be calculated in element 407 as follows $$c_u(n) = c_u(n-1) + f(u(n-1), u(n)) \quad (22)$$

where $$f(X,Y) = -1 \ \arg[Y] - \arg[X] > \pi$$

$$f(X,Y) = 0 \ |\arg[Y] - \arg[X]| \leq \pi$$

$$f(X,Y) = 1 \ \arg[Y] - \arg[X] < -\pi$$

arg[·] is the unwrapped phase angle lying between $-\pi$ and $\pi$. An equivalent expression for the function $f(X,Y)$ which may be used is $$f(X,Y) = -1 \ Im[Y] > 0, Im[X] < 0, Im[X^*Y] < 0$$

$$f(X,Y) = 1 \ Im[Y] < 0, Im[X] \geq 0, Im[X^*Y] > 0$$

$$f(X,Y) = 0 \ \text{otherwise}$$

The cycle count expression of equation 22 uses only u(n−1) and u(n) to make each cycle count decision. More complicated cycle count functions are possible using more samples, which are less likely to give an incorrect estimate corresponding to a cycle slip. The cycle count need only be recorded modulo M. The problem of choosing which Mth root in equation 20 is resolved using the cycle count function.

$$e^{-i\hat{\phi}(n)} = \sqrt[M]{\frac{u^*(n)}{|u(n)|}} e^{-ic_u(n)2\pi/M} \quad (23)$$

where the Mth root in equation 23 refers to the principal Mth root. The alternative embodiment described above made use of $\theta(n)$, the unwrapped phase angle of s(n). The unwrapped phase angle may be calculated as follows $$\theta(n) = \arg_{unwrapped}[s(n)] = \arg[s(n)] + 2\pi c_s(n)$$

where $c_s(n)$ is the cycle count of s(n) in analogy with equation 22.

The cycle count method of equation 22 cannot be implemented directly in a parallel digital signal processor, however, because it uses feedback from result $c_u(n-1)$ to calculate $c_u(n)$. This issue can be resolved by recasting equation 22 using a look-ahead computation.

$$c_u(n) = c_u(n-L) + \sum_{k=0}^{L-1} f(u(n-k=1), u(n-k)) \quad (24)$$

L may be chosen by the DSP designer to be large enough to avoid feedback operations that are not allowed. Equation 24 may be implemented in a parallel digital processor, although it is more complicated than the original algorithm of equation 22.

The parameter $\alpha$ appearing in equations 16 and 17 must be estimated accurately in order to use the correct Wiener filter. $\alpha$ depends on $\sigma_w$ and $\sigma_p$, according to equation 15. Before the phase estimate has been applied, $\sigma_p$ may be estimated from $|r(n)|^2$, since $$2\sigma_p^2 = \frac{\overline{|r|^2}}{\sqrt{2(\overline{|r|^2})^2 - \overline{|r|^4}}} - 1$$

The bar over a quantity indicates the time average. $\sigma_p$ may be estimated based on the time average of a moderate number of symbols. Similarly, $\sigma_w$ may be estimated from $$M^2 K \sigma_w^2 = \text{variance}(\arg[(r(n-K)^* r(n))^M]) - 2M^2 \sigma_p^2$$

where constant K is chosen large enough that the phase noise dominates over the effect of additive noise, but not so large that cycle slips occur, making the estimate inaccurate. Once phase estimation has started based on a preliminary value of $\sigma_w$, a better estimate of $\sigma_w$ may be made using a decision directed estimate.

Figure 5:
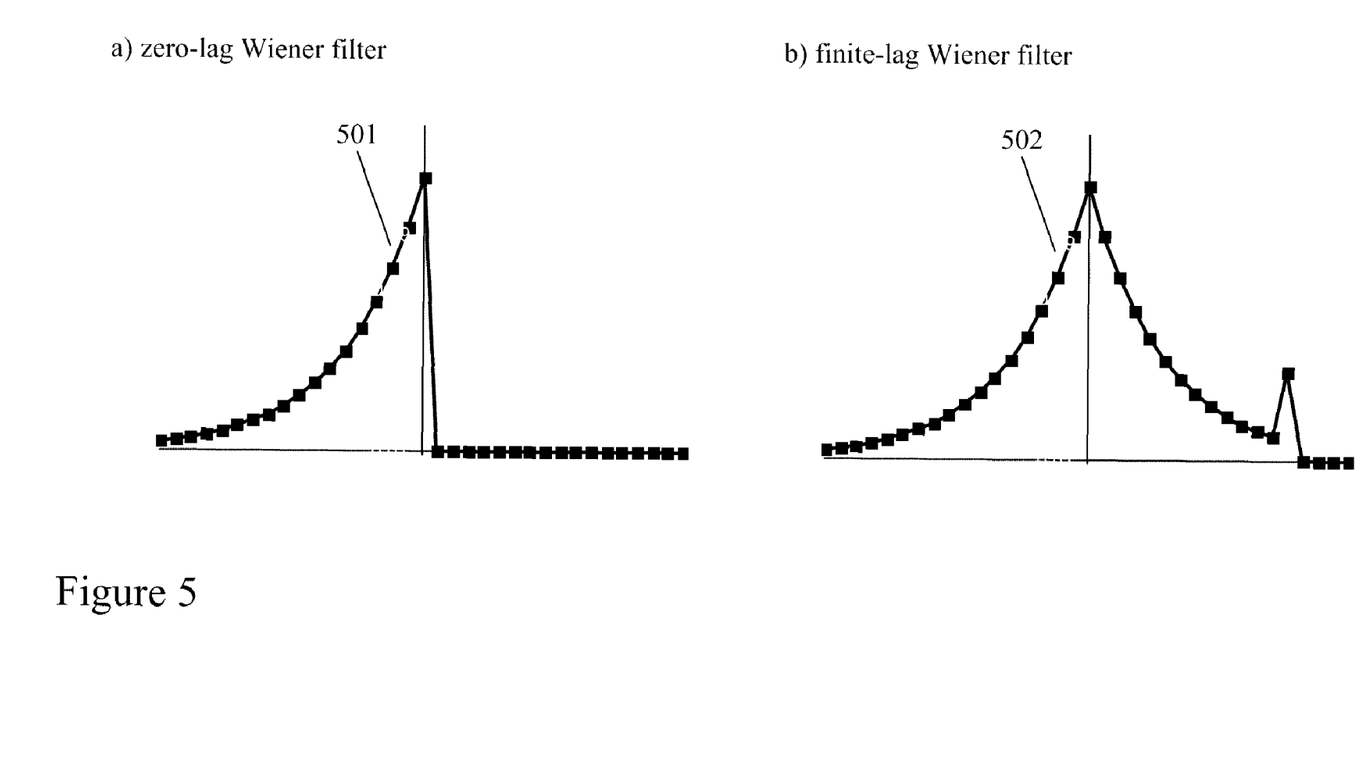
FIG. 5a illustrates an example of the impulse response function of a zero-lag Wiener filter.
FIG. 5b illustrates an example of the impulse response function of a finite-lag Wiener filter.
Figure 6:
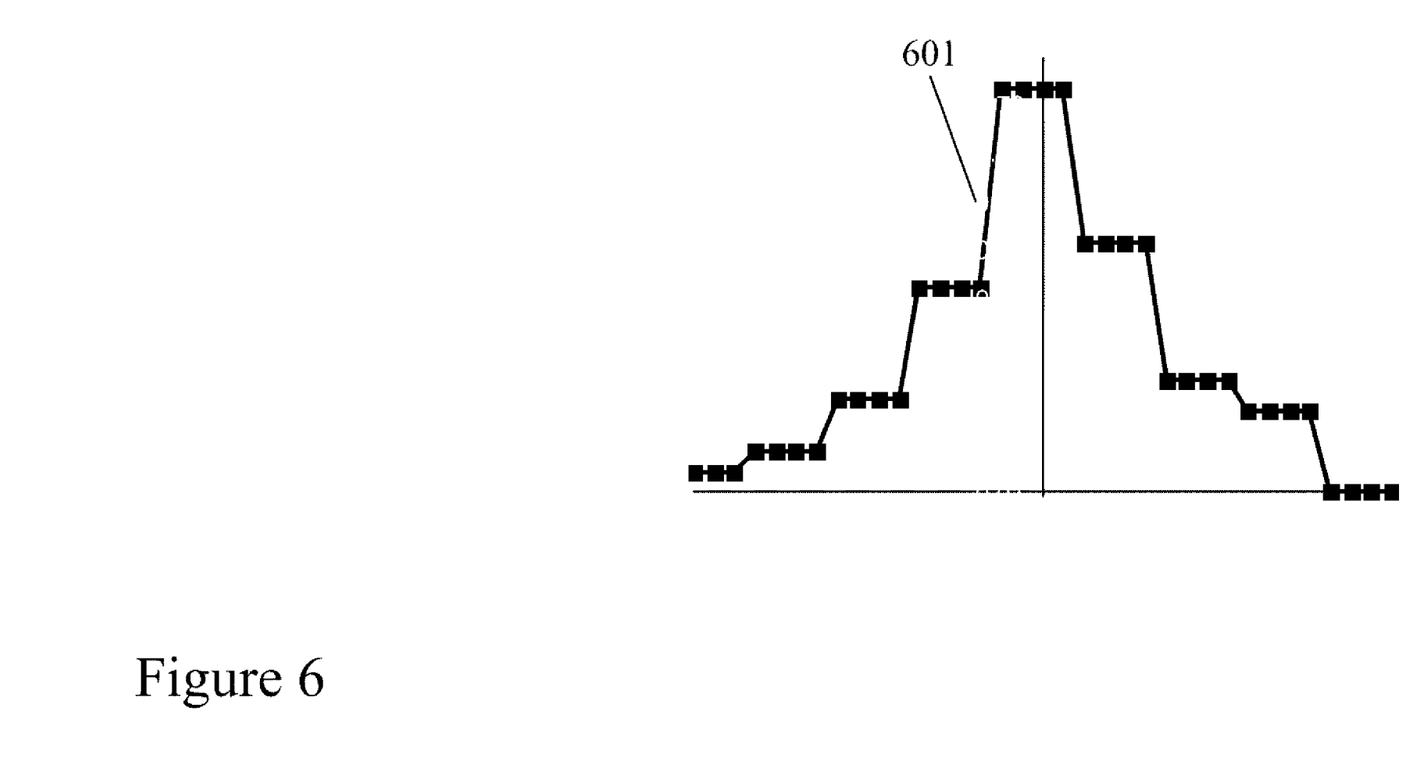
FIG. 6 illustrates an example of an approximate Wiener filter impulse response.

The use of a digital filter having the Wiener filter response leads to a phase estimate which is close to the optimum phase estimate. Clearly is also possible to employ a digital filter which is an approximation of the Wiener filter. The phase estimate will then be less accurate, but it may be acceptable. The approximate Wiener filter may be easier to implement than the exact Wiener filter. Following is an a example of an approximate Wiener filter. The implementation of the Wiener filter indicated by either of equations 16 and 17 has many feedforward taps, each with a different weight. FIG. 5*a* illustrates an example of the magnitude of the impulse response function of a zero-lag Wiener filter. FIG. 5*b* illustrates an example of the magnitude of the impulse response function of a finite-lag Wiener filter. The time response functions shown in FIG. 5 are examples of the feedforward tap weights for large L for the zero-lag Wiener filter 502 and the finite-lag Wiener filter 502. The multiplication operation requires more resources in a digital signal processor than the addition operation. Therefore it is easier to approximate the smoothly varying weights by a step-changing function. Such a step changing function is illustrated in FIG. 6, where 601 is an approximation of the finite-lag lag Wiener filter feedforward tap weights. The DSP may then sum groups of contiguous samples of u(n), and apply a digital filter such that each sum corresponds to one digital filter tap.

The present invention includes digital filters that approximate the Wiener filter response. It is necessary to state how close the digital filter must be to the Wiener filter in order to distinguish the present invention from the prior art, for example the planar filter with rectangular impulse response of "PLL-Free Synchronous QPSK Polarization Multiplex/Diversity Receiver Concept With Digital I&Q Baseband Processing" by R. Noé. Any linear filter is described by its impulse response (and a nonlinear filter may be described by the impulse response if its linear part). The time scale of the impulse response may be chosen so that the origin (n=0 point) corresponds to the point at which the estimate is made. Thus, a finite-lag filter has some non-zero values of impulse response for n>0 in addition to negative time, while a zero-lag filter has only zero time and negative time response. The present invention includes a digital filter which has an impulse response whose non-zero values have the trend of decaying for increasing $|n|$. When the filter is a finite-lag filter the impulse response therefore has a decaying trend for both the positive and negative time directions. When the filter is a zero-lag filter the trend is for decay in negative time. In addition, as has already been discussed above, the present invention uses either no feedback or it uses feedback of distant past results.

Although the number of cycle slips is low with an accurate cycle count included in the phase estimate, it is possible that the received symbol sequence $\hat{E}_s(n)$ contains some cycle slips compared to the transmitted symbol sequence $E_s(n)$. The effect of a cycle slip at symbol n is a phase rotation of that symbol and all subsequent symbols, so that all received data following symbol n may be incorrect. In practice, the high error rate will trigger a reset of the receiver, and the phase will be corrected at a subsequent framing word in the transmitted symbol sequence. The overall impact of the cycle slip may then be a large number of contiguous symbol errors, between the occurrence of the cycle slip and the framing word when the phase was reset. The number of errored symbols may be too large to be corrected by forward error correction decoding, so that the end recipient of the information experiences a large number of errors. The probability of cycle slip must be engineered to be much lower than the probability of bit error in the transmission system (before FEC correction). The number of cycle slips scales negative exponentially with the square root of the combined linewidth. Low cycle slip probability may be achieved by using narrow linewidth lasers, but this is undesirable because of the expense of the lasers. Simulations indicate that the linewidth requirement on the lasers to achieve a cycle slip probability sufficiently low for telecommunications applications is more stringent than the linewidth requirement to achieve a low bit error rate increase, by about two orders of magnitude.

Figure 7:
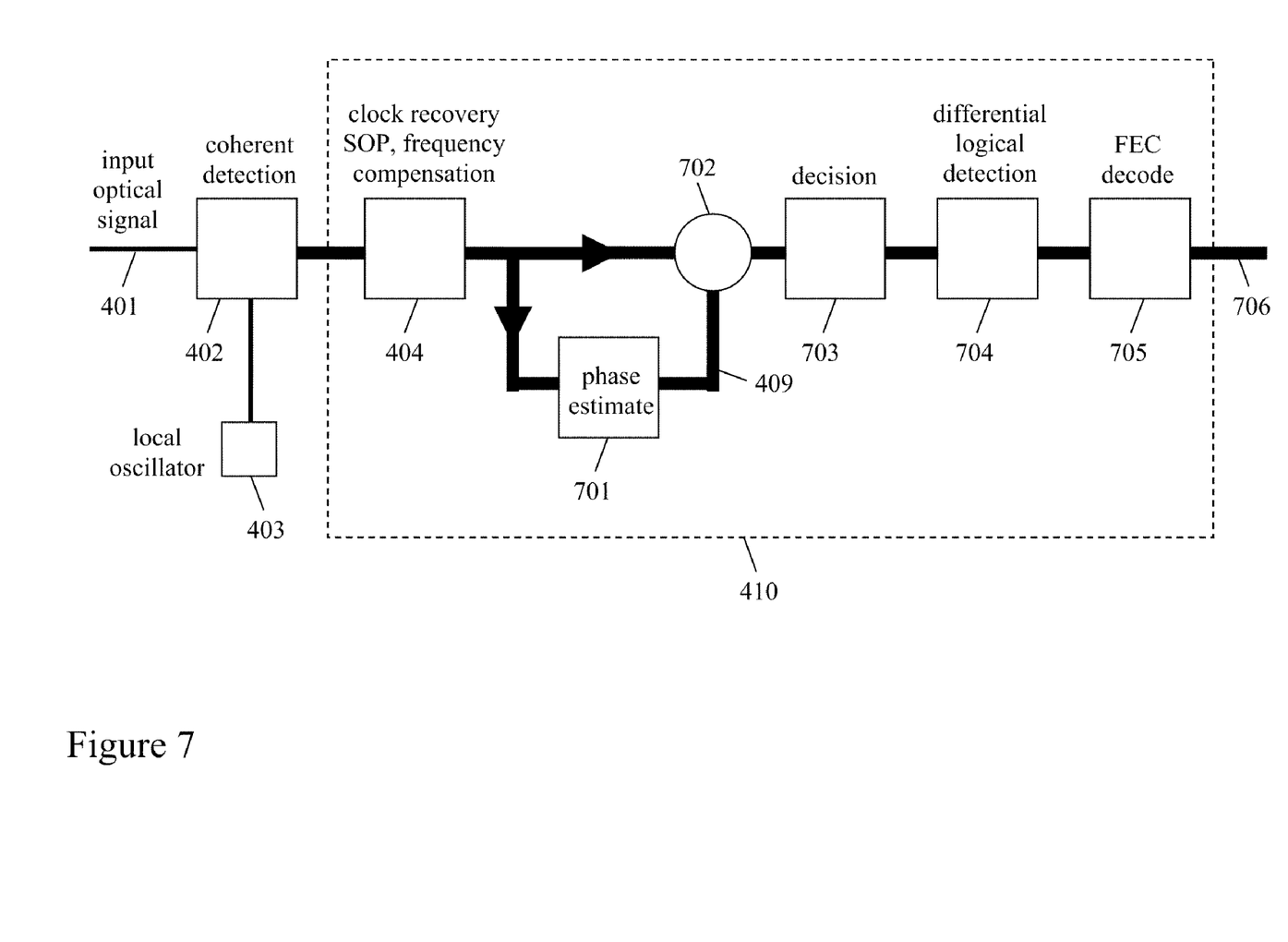
FIG. 7 illustrates the process of obtaining the information contained on an optical signal by coherent detection, followed by phase estimation and differential logical detection in the preferred embodiment of the present invention.

FIG. 7 illustrates the DSP 410 multiplying the output of the phase estimator 701 by r(n) at multiplier 702 to give $\hat{E}_s(n)$, in accordance with equation 21. A decision is made at element 703 of the data symbol $\hat{d}(n)$. The persistent nature of the impact of a cycle slip may be avoided by using differential logical detection (also known in the field of radio as differentially coherent detection) 704 after the symbol decision, and applying the appropriate precoding at the transmitter, as is described in "Synchronization techniques for digital receivers" by U. Mengali & A. N. D'Andrea. With differential logical detection the information content of the optical signal (before FEC decoding) is obtained by comparing the value of one symbol to an earlier symbol, usually the immediately preceding symbol. The information is the sequence $\hat{d}(n-1)*\hat{d}(n)$. After differential logical detection, a single cycle slip event becomes a single isolated symbol error. A disadvantage of differential logical detection is that each symbol error before differential logical detection is converted to a pair of contiguous symbol errors, equivalent to a short burst of bit errors. The increase in bit error rate reduces the advantage of using synchronous coherent detection over asynchronous coherent detection.

The output of the differential logical detection operation is decoded by an FEC decoder 705 to give the final data output 706. The increase in channel bit error rate due to differential logical detection may be reversed by employing an FEC code which inherently corrects short bursts of errors. There are many codes to choose from which inherently correct short error bursts, for example Reed-Solomon codes or cyclic codes. The statement that a block FEC code inherently corrects short bursts of errors means the following. A case of maximally errored block may be identified where a received block contains the maximum number of bit errors for complete error correction. After decoding, such a block contains no bit errors. The addition of one more isolated bit error to the maximally errored block will cause the block to contain one or more bit errors after decoding. However, following the substitution of one or more of the isolated bit errors for short bursts of bit errors, the block will still be decoded error-free. The only penalty that remains associated with the use of differential logical detection in conjunction with an FEC code that inherently corrects short error bursts is the difference between the gain of the chosen FEC code compared to the gain of the best possible code that could have been used. In practice this penalty is very small.

The G.975 code used in fiber optic transmission is based on a Reed-Solomon code, but G.975 does not lead to the absence of a penalty when used with differential logical detection. The reason is that G.975 includes an interleaving stage before the Reed-Solomon decoder. The interleaving stage effectively demultiplexes the FEC block into a number of columns of length $J_{FEC}$, and then processes the rows for FEC decoding. The purpose of the interleaving stage is to spread out a long burst of errors, longer than the length of burst that the Reed-Solomon code corrects naturally, so that the long error burst can be corrected without causing bit errors to remain after FEC decoding. An additional advantage of the interleaver is that the FEC block is easier to process by a parallel architecture digital processor in its demultiplexed form. The interleaving stage has the disadvantage that a short burst of errors is also spread out, and so it does not allow short error bursts to be corrected as if they were single errors. To avoid this behavior, the interleaver may be omitted. Alternatively the FEC code may be composed of a low overhead code that corrects short error bursts, followed by an interleaver, and then followed by a code to correct the remaining errors. This way the short error bursts arising from differential logical detection are corrected without penalty. In addition long bursts of errors are corrected, and the overall FEC code may be engineered to have high coding gain. A second alternative is for the differential logical detection operation to compare with an earlier symbol instead of the immediately preceding symbol, and so to have output $\hat{d}(n-J_{diff})*\hat{d}(n)$. $J_{diff}$ is chosen to be a multiple of $J_{FEC}$. This means that the burst of errors resulting from a single symbol error going into the differential logical detection operation is spread out at the output of the differential logical detection operation, and then appears as a short burst in one row of the interleaved FEC block. When a cycle slip occurs it causes $J_{diff}$ short bursts of bit errors instead of a single short burst of bit errors, but these short bursts appear in different FEC block rows and so are corrected without causing excess errors.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

APPENDIX A

Use of Complex Numbers to Describe Modulated Signals

Complex numbers are used to describe sine and cosine functions because this notation is a compact way of including the phase of the sine wave or cosine wave. For example the electric field is written in the form $$E(t) = Re[E_s e^{i\omega t}] \quad (A1)$$

where $E_s$ is a complex number. This may be expressed in terms of sines and cosines as $$E(t) = Re[E_s]\cos(\omega t) - Im[E_s]\sin(\omega t)$$

Or if complex $E_s$ is written in terms of its magnitude and phase $$E_s = |E_s|e^{i\theta_s}$$

then A1 becomes $$E(t) = |E_s|\cos(\omega t + \theta_s)$$

The complex number notation is compact because the phase of the sine wave is stored in the phase of the complex number.

In the above discussion are equations similar to $$\text{beat term} = Re[E_s E_{LO}^* e^{i\omega t}] \quad (A2)$$

$E_{LO}^*$ is the complex conjugate of $E_{LO}$, meaning that every occurrence of i is replaced with −i, and $$E_{LO}^* = |E_{LO}|e^{-i\theta_{LO}}$$

A2 may be rewritten as $$\text{beat term} = |E_s||E_{LO}|\cos(\omega t + \theta_s - \theta_{LO})$$

The appearance of $E_s E_{LO}^*$ in A2 means to take the phase difference between $E_s$ and $E_{LO}$.

The power of an optical wave is given by the magnitude squared of the complex electric field, and does not have a sinusoid time dependence. So in the case of a field given by A1

$$\text{power} = (E_s e^{i\omega t})^*(E_s e^{i\omega t}) = |E_s|^2$$

APPENDIX B

Jones Vectors

The state of polarization of an optical signal may be described by a Jones vector. This is a two element column vector. Each element is the complex envelope of the electric field, i.e., phase information included. The top element is the component of the field in the x-direction (horizontal) and the bottom element in the y-direction (vertical). In fact x and y may be an arbitrary pair of orthogonal directions. "Optics" by E. Hecht (Addison-Wesley, 4th ed., 2001) gives a thorough account of Jones vectors.

Some Jones vectors of familiar states of polarization are listed below.

$$\begin{pmatrix} 1 \\ 0 \end{pmatrix} \text{ horizontal}$$

$$\begin{pmatrix} 0 \\ 1 \end{pmatrix} \text{ vertical}$$

$$\frac{1}{\sqrt{2}}\begin{pmatrix} 1 \\ 1 \end{pmatrix} \text{ linearly polarized at } 45°$$

$$\frac{1}{\sqrt{2}}\begin{pmatrix} 1 \\ i \end{pmatrix} \text{ circular}$$

A Jones unit vector $\tilde{p}$ has the property that $$\tilde{p} \cdot \tilde{p}^* = 1$$

If light polarized in SOP $\tilde{p}_1$ passes through a polarizer oriented in direction $\tilde{p}_2$, then the magnitude of the electric field is scaled by $\tilde{p}_1 \cdot \tilde{p}_2^*$, and the direction of the electric field is changed to $\tilde{p}_2$. In general $0 \leq |\tilde{p}_1 \cdot \tilde{p}_2| \leq 1$.

When polarized light is passed through a linear optical element, the transformation of the SOP is described by pre-multiplying by a 2×2 matrix called the Jones matrix of the optical element.

What is claimed is:

1. A coherent optical detection system receiving an input optical signal containing digital information, the input optical signal having signal phase noise and additive noise, the coherent optical detection system comprising:
a local oscillator laser, the local oscillator later having local oscillator phase noise; and
a digital signal processor, the digital signal processor having a parallel architecture; wherein:
the digital signal processor applies a nonlinear function to values of the complex electric field of the input optical signal to produce nonlinear function output values; and
the digital signal processor applies a filter to values derived from the nonlinear function output values, said filter being close to a Wiener filter appropriate to the additive noise, signal phase noise and local oscillator phase noise;
whereby said digital signal processor estimates the phase of the input optical signal compared to light from the local oscillator.

2. The coherent optical detection system of claim 1 wherein the filter is close to a finite-lag Wiener filter.

3. The coherent optical detection system of claim 1 wherein the filter is close to a zero-lag Wiener filter.

4. The coherent optical detection system of claim 1 wherein the Wiener filter is appropriate to Lorentzian lineshape signal source and local oscillator laser and appropriate to Gaussian additive noise.

5. The coherent optical detection system of claim 1 wherein the filter has an impulse response, and the non-zero values of the impulse response have a feature that the trend of the values of the impulse response is to decay from zero time in the direction of negative time, and to decay from zero time in the direction of positive time.

6. A coherent optical detection system receiving an input optical signal containing digital information, the input optical signal having signal phase noise and additive noise, the coherent optical detection system comprising:
a local oscillator laser, the local oscillator laser having local oscillator phase noise; and a digital signal processor, the digital signal processor having a parallel architecture; wherein:

the digital signal processor applies a nonlinear function to values of the complex electric field of the input optical signal to produce nonlinear function output values; and the digital signal processor applies a cycle count function to values derived from the nonlinear function output values;

whereby said digital signal processor estimates the phase of the input optical signal compared to light from the local oscillator;

said digital signal processor applies a filter to values derived from the nonlinear function output values to produce filtered output values, said filter being close to a Wiener filter appropriate to the additive noise, signal phase noise and local oscillator phase noise; and the digital signal processor applies said cycle count function to values derived from said filtered output values.

7. A coherent optical detection system receiving an input optical signal containing digital information, the input optical signal having signal phase noise and additive noise, the coherent optical detection system comprising:

a local oscillator laser, the local oscillator laser having local oscillator phase noise; and a digital signal processor, the digital signal processor having a parallel architecture; wherein:

the digital signal processor applies a nonlinear function to values of the complex electric field of the input optical signal to produce nonlinear function output values; and the digital signal processor applies a cycle count function to values derived from the nonlinear function output values;

whereby said digital signal processor estimates the phase of the input optical signal compared to light from the local oscillator;

the digital signal processor calculates the phase angle of the nonlinear function output values to produce wrapped phase angle values; and the digital signal processor applies the cycle count function to the wrapped phase angle values to produce unwrapped phase angle values; and the digital signal processor applies a filter to values derived from the unwrapped phase angle values, said filter being close to a Wiener filter appropriate to the additive noise, signal phase noise and local oscillator phase noise.

8. A method of estimating the phase of an input optical signal to a coherent optical receiver compared to light from a local oscillator laser, said method comprising the steps of:

applying a nonlinear function to values of the complex electric field of the input optical signal to produce nonlinear function output values; and applying a digital filter to values derived from the nonlinear function output values, said digital filter being close to a Wiener filter appropriate to the additive noise and the phase noise on the input optical signal and the phase noise of the local oscillator, and said digital filter not employing feedback of immediately preceding results.

9. The method of claim 8 wherein the digital filter is close to a zero-lag Wiener filter appropriate to Lorentzian lineshape signal source and Lorentzian lineshape local oscillator laser and appropriate to Gaussian additive noise.

10. The method of claim 8 wherein the digital filter is close to a finite-lag Wiener filter appropriate to Lorentzian lineshape signal source and Lorentzian lineshape local oscillator laser and appropriate to Gaussian additive noise.

11. A method of estimating the phase of an input optical signal to a coherent optical receiver compared to light from a local oscillator laser, said method comprising the steps of:

applying a nonlinear function to values of the complex electric field of the input optical signal to produce nonlinear function output values;

applying a cycle count function to values derived from the nonlinear function output values, the cycle count function not employing feedback of immediately preceding results;

applying a digital filter to values derived from the nonlinear function output values to produce digital filter output values, said digital filter being close to a Wiener filter appropriate to the additive noise and the phase noise on the input optical signal and the phase noise of the local oscillator, said digital filter not employing feedback of immediately preceding results; and applying the cycle count function to values derived from the digital filter output values.

\* \* \* \* \*